Aug. 5, 1952 J. W. YEARSLEY 2,606,286

INTERFERENCE REDUCING SYSTEM

Filed Dec. 8, 1948

INVENTOR
JOHN W. YEARSLEY.
BY H. L. Newton
ATTORNEY

Patented Aug. 5, 1952 2,606,286

UNITED STATES PATENT OFFICE 2,606,286

INTERFERENCE REDUCING SYSTEM

John W. Yearsley, Haddonfield, N. J., assignor to Radio Corporation of America, a corporation of Delaware Application December 8, 1948, Serial No. 64,126

9 Claims. (Cl. 250—27)

This invention relates to multi-band signal transfer systems, and more specifically to power supply arrangements for reducing interference to such systems.

It has been found that signal transfer systems operating in a multiplicity of signal frequency bands are likely to be subjected to interference by undesired noise attributable to the rectifier type of power supplies with which they are operated. The power supply rectifier appears to cross modulate signals in the desired bands with undesired signals, even where the undesired signals are of a remote frequency, and the cross modulation output, being in the desired frequency range, is picked up by the transfer system as interference that cannot be tuned out. Although it would be expected that the simple bypassing of the rectifier should reduce such noise, this has been found to be ineffective. Even the use of separate by-pass circuits, each individually designed to properly by-pass the respective band of signal frequencies, has proven inadequate. The interference is especially pronounced in transfer systems, such as radio receivers, of the A. C.-D. C. type that have power supplies interchangeably operated by connection to either alternating or direct current power lines. Such power supplies use transformerless rectifier circuits that are not appreciably isolated from the power lines to which they are connected. The desired signals as well as the interfering signals appear to be effectively supplied to the rectifier by these power lines.

Among the objects of this invention is the provision of novel power supply arrangements for reducing the interference in signal transfer apparatus to signals in a multiplicity of different frequency bands, which interference is introduced through the power supply.

Further objects of the invention include novel signal transfer systems with a power supply including a rectifier that is suitably by-passed for at least two different frequency bands of signals which would otherwise be rectified and interfere with the operation of the system.

Other objects of the invention include novel rectifier by-passing circuits for by-passing different bands of signals without developing undesired interaction between the by-passing circuits.

Still other objects of the invention are novel radio receiver systems in which a transformerless power supply rectifier is provided with a by-pass network including two different capacitive by-pass paths, at least one of which may behave as an inductance at some frequencies, and the network is damped to lower the resonant impedance it presents as a result of this inductance.

An additional object of the invention is novel A. C.-D. C. radio receiver systems having a power line signal supply and a transformerless power rectifier structure wherein the rectifier is capacitively by-passed for two signal bands by a network which includes an inductance, and the network is damped by a resistance which is also connected as part of the rectifier structure and/or receiver circuit.

The above as well as other objects of the invention will be best understood from the following descriptions of exemplifications thereof, reference being had to the accompanying drawings wherein.

According to the present invention, a multiband electronic signal transfer system is supplied with electron-flow-actuating power from a power supply rectifier arranged for connection to an electric power line, and separate rectifier by-pass paths are provided to decrease interference in the respective bands by signals in those bands which may appear on the power line and be rectified. At the same time the by-pass network which tends to resonate to some of the signals as a result of inherent inductances, is damped by a resistor which may have a dual function and be used elsewhere in the operating circuit.

Figure 1:
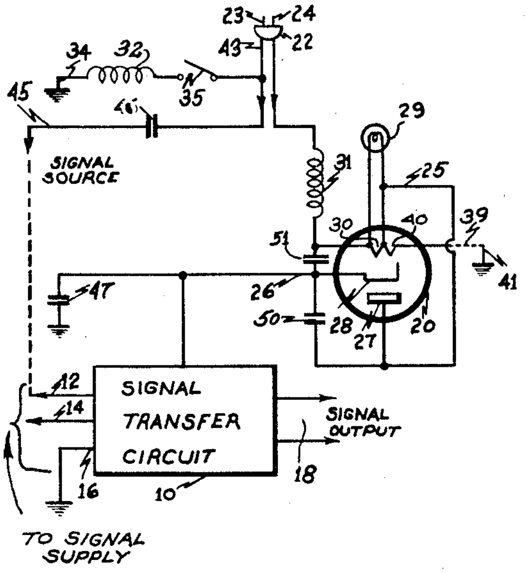
Fig. 1 is a schematic circuit of one modification of the invention with parts in block diagram form.

Fig. 1 shows a modification of the invention in which a signal transfer circuit shown by the block 10 is provided with a multiplicity of signal input circuits represented by the input leads 12, 14, 16. One of these leads may be a common ground, as shown at 16 the remaining leads being the high signal potential sides of different signal supply circuits. A signal output for the signal transfer circuit is shown at 18. The transfer circuit itself is not shown in all its details, inasmuch as any suitable circuit arrangement may be used. Such circuits are well known in the art and need not be described here except to say that they include one or more electronic transfer stages that are energized by direct current (D.-C.) power. For a selection of suitable transfer circuits in the form of radio receiver systems, reference is made to the several volumes of Rider Troubleshooter's Manuals, published periodically by John F. Rider, Publisher, Inc., New York 16, New York.

For supplying D.-C. operating power, an A. C.-D. C. energizing circuit including a rectifier shown in the form of an electron-discharge tube 20, is connected to a supply plug 22 having projecting prongs 23, 24 for insertion in a power source such as a power line connection receptacle. The connections to the prongs 23, 24 are provided by rectifier leads 25, 26 connected respectively to the anode 27 and cathode 28 of the rectifier. In the form shown the circuit from lead 25 to prong 24 is completed through a pair of parallel-connected resistance elements 29, 30, and an inductance 31. The other lead 26 returns to prong 23 through the signal transfer circuit, the power supply for which is completed by ground return 16, the supply plug ground 34, a second inductance 32, and power supply switch 35.

Resistance element 29 is shown as incandescent lamp connected across the terminals of resistance element 30, while this element 30 is connected in series with another resistance element 40 to provide an electric heating circuit for heating the rectifier cathode 38 to suitable operating temperature. The heating circuit is completed by ground return 41 through connector 39 shown in dash lines. Connector 39 may merely be a lead serving no function other than to establish this ground return, or it may be in the form of a circuit including other functional parts of the signal transfer system. Thus, for example, it may include additional electric heater elements for heating one or more electron-discharge cathodes of different electron-discharge tubes included in the circuit 10.

In the circuit shown in Fig. 1, lamp 29 forms an on-off indicator which is controlled by power supply switch 35. When this switch is open, the ground return connection from prong 23 is broken, thereby opening all the power circuits. Lamp 29 indicates this condition by not generating any light. When switch 35 is closed the power circuits are completed and energizing current flows through connector 39 and the rectifier heater combination formed by the resistance element 30, 40. The voltage drop thereby appearing across resistance element 30, causes energizing current also to flow through lamp 29 and bring it into light emissive condition, thereby indicating the energized condition of the system. As shown, additional switch structure 43 may be inserted in the power supply leads for automatically opening one or both of these leads when the system is tampered with, thereby insuring that inexperienced hands are not exposed to the relatively high voltages usually present in the system. The system including circuit 10, rectifier 20, and associated leads may be confined within a housing and a switch structure 43 may be interlocked with a part of the housing that must be removed to gain access to its interior. Such interlocking switch arrangements are well known and form no part of the present invention.

Rectifier 20 in the construction of Fig. 1 has its cathode 28 spaced from and indirectly heated by the heater elements 30, 40. A short time after the initiation of heating current through the heater elements, the cathode 28 will be heated to its operating temperature and will discharge or emit electrons in sufficiently large number to permit the passage of the required D.-C.

operating current from the rectifier plate 27 to the cathode and thence through the signal transfer circuit 10 where it actuates the flow of electrons in electronic transfer stages such as those including electron-discharge amplifier tubes. The entire direct current circuit is established from 24 through an inductance 31, the parallel combination of resistance element 30 and lamp 29, lead 25, anode 27, cathode 28, lead 26, signal transfer circuit 10, ground return 16, ground 34, inductance 32, closed contacts of switch 35, and prong 23. The same D.-C. circuit operating path will be established whether the prongs 23, 24 are supplied with direct or alternating electric currents, inasmuch as the rectifier electron flow will transmit direct current or rectify alternating current. With D.-C. sources, proper connection polarity must be observed with the power supply plug since the rectifier only passes current in one direction. The heater elements 30, 40 forming part of an energizing circuit that does not include a rectifier, will accordingly be energized by the direct passage of D. C. or A. C. from the prongs 23, 24, depending upon the type of power supply. With A.-C. sources the parallel combination of resistance element 30 and lamp 29 will carry the alternating heater currents as well as the rectified D.-C. electron-flow-actuating power supply.

The construction of Fig. 1 also includes a signal source 45 in the form of a so-called "power line antenna." The conductor indicated at 45 is connected to one of the power supply prongs through a capacitor 46 and may also be directly connected to one of the signal supply leads such as lead 12 in the manner indicated in dash lines. Inductances 31, 32 are interposed between the prongs and the rectifier to keep the signal source at a relatively high signal potential with respect to the ground returns. In many cases the signals desired at the supply circuits 12, 14 appear in suitable amounts directly on the power line to which the prongs 23, 24 are connected, as well as in the conductive paths between these prongs and inductances 31, 32. Although Fig. 1 shows these conductive paths as quite short, in actual constructions they may be several feet long to enable the system to be plugged into distant power supply receptacles. As a result the power line antenna 45 is the only signal source required with which to satisfactorily operate the circuit 10. This arrangement proves highly practical for receiving signals in high frequency bands extending above about 20 megacycles per second. It is particularly desirable in the reception of frequency modulation signals such as those in the 88 to 108 megacycles per second band presently assigned, making a highly suited substitute for the more awkward external antenna that would otherwise be necessary.

When the system of Fig. 1 is energized from an A.-C. power line an appreciable amount of annoying interference is developed in the signal output unless some provision is made for capacitively by-passing the rectifier electrodes 27, 28. This interference appears to result from the presence of the desired incoming signals on the power line and their rectification by the rectifier 20. Such rectified signals apparently become modulated by the rectified pulses of alternating power line energy which are also rectified in this rectifier. The result is the development of signals in the desired signal range but having a definite low frequency component corresponding to the alternations of a power line energy and/or multiples thereof. These undesired signals are picked up by the signal transfer circuit and make themselves objectionably evident by contributing a relatively high hum level to the signal output. This difficulty is not avoided by merely substituting an external antenna for a power line antenna. There appears to be a sufficient amount of inherent linkage in transfer systems generally to cause the appearance of the objectionable hum developed in the rectifier. Furthermore, the inductances 31, 32, which are arranged to present a relatively high impedance to the power line antenna signals, are also insufficient to satisfactorily reduce the hum. Even the combination of the external antenna and the inductances 31, 32 will not be satisfactory for this purpose.

Figure 2:
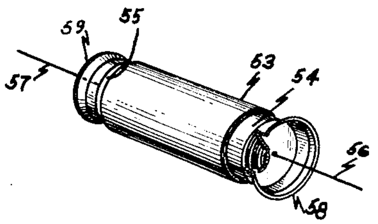
Fig. 2 is a perspective view of a typical capacitor that may be used as part of the novel constructions of the invention.

According to the invention, a capacitor 50 is connected to form a capacitive circuit directly across the rectifier electrodes or leads and a second capacitor 51 forms a second capacitive circuit between these electrodes. The second capacitive path includes the resistance of the parallel combination of resistance element 30 and lamp 29. One of the capacitors, capacitor 50 for example, is arranged to present across the rectifier electrode a very low impedance to signals in the high frequency band supplied to the transfer circuit. The second capacitor 51 is of higher capacitance and presents a correspondingly low impedance to the passage of signals in the low frequency signal band to which the transfer circuit responds. It has been found that a common capacitive path will not properly by-pass both the high frequency and the low frequency signals across the rectifier. This is especially pronounced where the bands are of widely different frequencies. For signals in the so-called standard broadcast band having frequency below about 2 megacycles per second a by-passing capacitance of at least about 0.05 microfarad is required for satisfactorily reducing the hum level. Practical capacitors of such capacitance have an inherent inductance which is large enough to render such a capacitor practically useless for by-passing signals having frequencies above about 20 megacycles per second. This difficulty has proved particularly troublesome with the practical forms of suitable capacitors. Fig. 2 diagrammatically illustrates a readily available inexpensive low-frequency by-pass capacitor suitable for use with the invention. Fundamentally this capacitor is formed of spirally wound turns of one or more dielectric sheets shown at 53. These sheets function as the capacitor dielectric and along the opposite faces of one sheet or of a set of laminated sheets, capacitor electrodes 54, 55, extend. The different electrodes are shown as separate spirally wound metal foils between which the dielectric sheet is sandwiched, all being wound up together. To insulate the foil on the inner face of the dielectric from the other foil on the outer face of the previously wound turns, additional dielectric sheets may be provided. Each electrode is formed of spirally wound turns similar to the dielectric but projecting out beyond the opposite edges of the dielectric winding 53. Capacitor leads 56, 57 are connected respectively to the projecting ends of the electrodes 54, 55 by means of enlargements shown in the form of conductive contactors 58, 59. This is the so-called "non-inductive" type of capacitor in which attempts are made to provide direct electrical engagement of the respective capacitor leads with the edges of all the turns of the corresponding electrodes. The entire combination is surrounded by or imbedded in an insulating holder which protects it from deleterious atmospheric influences.

It has been found that the "non-inductive" capacitor such as shown in Fig. 2 exhibits an appreciable and even considerable inductance to high frequency signals. Some of this inductance may be attributed to the length of the capacitor leads and some appears to result from the imperfect or varying contact made by the contactors 58, 59 with the electrode turns. In any event, these capacitors are quite unsuited for the high frequency application.

Accordingly a second and parallel capacitive path with a capacitance of about 0.005 microfarad is provided for the high frequency band. The combination of these by-pass paths causes a sufficient amount of any such signals present on the power line to be harmlessly returned to ground without rectification, and an objectionable hum level cannot be developed. As shown in Fig. 1, the return of these by-passing signals to ground may be completed through condenser 47 which may be part of the rectifier filter assembly, which transforms the rectified pulsations of alternating current to a substantially ripple-free direct current.

The simple connection of both capacitors 50, 51, in parallel, has been found to be of only limited utility. At the high frequencies involved the inherent inductances associated with one or both of these capacitors makes the combination a parallel-resonant circuit which may be tuned within one of the desired signal bands. Accordingly the parallel combination of capacitors would present the relatively high impedance of a resonant circuit to such signals, thereby substantially completely preventing any by-passing action. In many cases the inductance of the by-pass network is subject to such a degree of variation as to make it impossible to tune it to any predetermined frequency outside the desired signal bands.

The present invention gets around this difficulty by incoporating an appreciable resistance in one of the capacitive by-pass paths. This resistance which need be no more than about 20 ohms, effectively damps the resonant circuit thereby greatly lowering its resonant impedance. By this technique, the parallel capacitive paths may be used for commercial production with the assurance that even considerable tolerance in the capacitance and/or inductance of the by-passing paths will not cause any objectionable hum development in any of the individual systems.

Fig. 1 shows one form of the invention in which the parallel connected resistance element 30 and lamp 29 are utilized as resistor structure in series in the low frequency by-pass path including capacitor 51. This is another important feature of the invention, inasmuch as it dispenses with the need for a separate damping resistor and enables a single resistor structure to fulfill dual purposes. In fact, the resistance structure 30, 29 of the construction of Fig. 1 can be said to have a triple function, providing indicator lamp operation, rectifier heating and by-pass damping.

Figure 3:
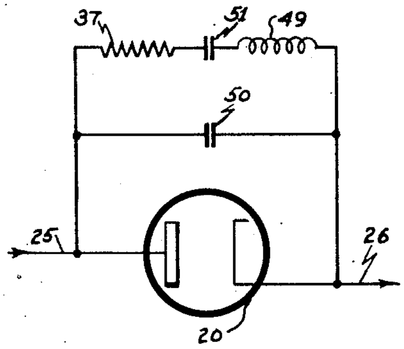
Fig. 3 is a circuit diagram of the equivalent rectifier circuit in the embodiment of Fig. 1.

Fig. 3 is the equivalent representation of the rectifier circuit in the construction of Fig. 1. The rectifier 20, with power supplied by lead 25 and delivered to the load by lead 26, is more clearly shown as by-passed by parallel capacitive circuits. One circuit has the capacitance 50, the other has the capacitance 51 in series with an inductance 49 and resistor structure 37. Inductance 49 is the inherent inductance of the capacitor used to provide capacitance 51. Resistor structure 37 corresponds to the resistance of the parallel combination of heater element 30 and lamp 29. High frequency signals are by-passed by capacitor 50 whereas low frequency signals are by-passed by capacitor 51, its inductance being insignificant for these low frequencies. The resistor structure 37 is of too small a resistance to have any appreciable effect on the signal by-passing efficacy. In fact the resistor structure may be placed in series in the high frequency by-pass path across the rectifier, if desired.

Figure 4:
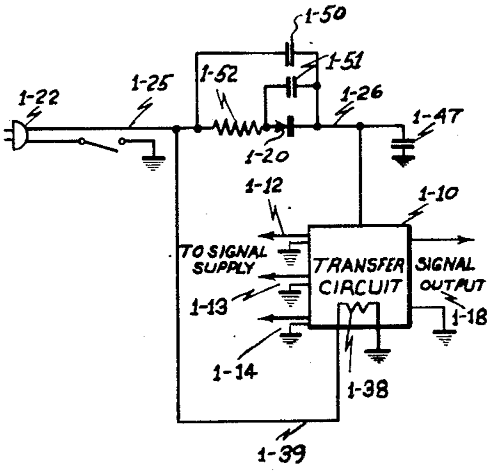
Fig. 4 is a diagram similar to Fig. 1 of a different modification of the invention.

Fig. 4 shows a modified transfer circuit system of the invention. This system is generally similar to that of Fig. 1 including a transfer circuit 1—10, three pairs of signal supply leads, 1—12, 1—13, and 1—14, and signal output connections 1—18. Electron-flow signal transfer elements in the circuit 1—10 are provided with D.-C. electron-flow-actuating energy by means of a rectifier 1—20, which is connected to a plug 1—22 for power line energization. In this modification of the invention, the rectifier 1—20 may be of the dry plate or metal contact type. Such a rectifier having a selenium layer suitably treated and engaged by separate plates is particularly suitable.

The by-pass paths of the invention are provided by the high frequency capacitor 1—50 and the low frequency capacitor 1—51, which, together with the resistance 1—52, is in parallel with the high frequency capacitor. The paths are connected across the rectifier leads 1—25 and 1—26 and operated in substantially the same manner as described above in connection with Fig. 1.

The resistor 1—52 need have no other function in addition to that of a damping resistance as described above. However, it can also be inserted in the rectifier input lead 1—25 to assist in limiting the peak values of rectifier surges, as when the rectifier is used in combination with the filter circuit having an input filter condenser 1—47 of relatively high capacitance. An additional power supply circuit is shown at 1—39 for delivering unrectified power to the transfer circuit for the operation of indicator lamps, directly or indirectly heated electron discharge tube cathodes, relays, etc.

The damping resistor of the invention may be supplied in any other suitable manner as for example by so using any other resistance normally connected directly to the rectifier leads. For example, a rectifier filter in the form of a series filter resistor and shunt capacitances can have the filter resistor serve for by-pass damping. Indicator lamps may be connected in the power lead before or after the rectifier and also serve as damping resistors. In many practical circuits an indirectly heated electron discharge tube cathode has a heater resistor connected directly to the power line lead 1—39 as shown at 1—38 in Fig. 3, and such a heater resistance is also highly effective for damping purposes.

With some rectifiers, such as those of the metal contact type having a relatively small number of plates, each of relatively large area, the rectifier itself has a sufficient inherent capacitance across its electrodes to provide all the by-passing needed for preventing interference with high frequency signals. With this type of construction, one of the by-pass capacitors may be omitted. However, the disturbing resonance effects are not avoided by such omission inasmuch as the rectifier capacitance can and does resonate with any inductance in a by-pass circuit. Accordingly the damping resistance of the invention is still needed to insure the absence of undue interference. The damping resistance should have an impedance to the by-passing signals lower than that of the rectifier, to permit effective by-passing.

Power line antennas, where used in constructions embodying the invention may be of any suitable type, responding to either the push-pull signal currents in the respective power line leads, or the unsymmetrical signal currents that return to earth from either or both of the power line leads. This earth return is not necessarily the ground connections shown in the figures inasmuch as these ground connections are usually not properly returned to earth for high frequency signals. So far as the unsymmetrical signal currents are concerned the power line leads are effectively a simple antenna and simple by-passing to earth generally cannot be provided. These signals accordingly appear at the power supply rectifier unless more elaborate circuit precautions are taken.

While several exemplifications of the invention have been indicated and described above, it will be apparent to those skilled in the art that other modifications may be made without departing from the scope of the invention as set forth in the appended claims.

What is claimed is:

1. In a power supply combination for a signal transfer system: a rectifier for connection to a source of electric current and to said system, said rectifier developing interfering cross modulation when signals are supplied to it along with the electric current; a by-pass network across said rectifier having a plurality of capacitive circuits connected to by-pass signals of different bands of frequencies across the rectifier and thereby reduce the cross modulation, at least one of said capacitive circuits in said network having inductive reactance for signals in one of said bands; a low resistance portion connected to the last mentioned capacitive circuit in said network, thereby reducing the high impedance presented to signals to which the circuit resonates as a result of the combination of its capacitance with said inductance.

2. In a power supply system for supplying energizing current to signal transfer apparatus and the like, said system including a rectifier for connection to a source of alternating electric current to rectify such current and to deliver direct current to said apparatus, said rectifier providing hum modulation interference when radio frequency signals are supplied to it along with the alternating current; a first capacitive circuit connected to by-pass said signals in one range of frequencies across the rectifier for diminishing the interference to such signals; at least part of said circuit having appreciable inductive reactance to signals of a higher range of frequencies, a second capacitive circuit for by-passing signals of such higher frequency across the rectifier and diminishing the interference to these signals; and a series connected resistor in said first capacitive circuit having an impendance less than that of the rectifier connected to decrease the impedance of the resonant network formed by said inductive reactance and the capacitive reactance of the combination of by-pass circuits.

3. In a multi-band electronic signal transfer system having a transformerless electron-flow-actuating power supply including rectifier structure with leads for connection to an electric power source: by-pass elements for reducing hum modulation interference resulting from the rectification of radio frequency signals appearing on said leads, said by-pass elements including a first capacitor connected for by-passing signals in a relatively low radio frequency signal band across the rectifier; a second capacitor connected for by-passing signals in a relatively high radio frequency signal band across the rectifier, said first capacitor presenting an inductive reactance to signals in the high frequency signal band, and voltage-dropping resistor means connected directly to one of the rectifier leads for carrying at least a part of the current from the power line; said resistor means being connected in series with one of said capacitors for lowering the resonant impedance of the inductive reactance and said capacities to by-passing signals.

4. A multi-band electronic signal transfer system combination as defined by claim 3, in which at least part of the voltage-dropping resistor means forms part of the rectifier structure.

5. In a multi-band electronic radio signal receiving system having a transformerless electron-flow-actuating power supply including rectifier structure with leads for connection to an electric power line: a first capacitor connected for by-passing signals in a low frequency signal band across the rectifier structure; a second capacitor for by-passing signals in a high frequency signal band across the rectifier structure, said first capacitor presenting an inductive reactance to signals in the high frequency signal band, and resistor means connected in series with one of said capacitors to lower the impedance of the resonant circuit formed by the inductive reactance and the capacitance of said second capacitor.

6. In a multi-band electronic radio signal receiving system combination as defined by claim 5, the further features that the rectifier structure includes an electron collecting electrode, and a thermally responsive electron-supplying electrode; and the series resistor means includes at least part of a heat-generating resistance connected to one of the rectifier leads for carrying current supplied by the power line and heating the electron-supplying electrode.

7. A power supply combination as recited in claim 1, in which the rectifier includes a rectifier anode and a rectifier cathode adjacent the anode; and the inherent capacitance between the cathode and anode forms one of said capacitive by-pass circuits.

8. In an A. C.-D. C. multi-band radio signal receiver system for receiving signals in a plurality of frequency bands and having a transformerless electron-discharge power supply rectifier connected for interchangeable energization by alternating as well as direct current, said rectifier including a thermally actuated cathode, and heating means connected for heating the cathode, and said rectifier developing interfering cross modulation when signals as well as energizing current are rectified by it: by-pass elements for reducing the rectification of signals in said bands by the power supply rectifier, said by-pass elements including a first capacitive path across the rectifier for by-passing signals in one of the said frequency bands to reduce interference to that band, a second capacitive path across the rectifier for by-passing signals in a second frequency band to reduce interference to the second band; at least part of one of said paths behaving as an inductance to signals in the band having the higher frequencies; said by-pass elements also including resistor structure connected in series in one of said paths to damp the resonant circuit formed by the combined capacitance and inductance, for lowering the resonant impedance it presents to signals to be by-passed; said resistor structure being also connected to provide at least part of the rectifier cathode heating means.

9. An interference reducing system for radio power supply rectifiers and the like, comprising in combination a rectifier device, a shunt circuit therefor providing a first capacitive bypass path for signals in a high frequency band, a second shunt circuit for said rectifier device providing a second capacitive by-pass path in parallel relation to the first path for signals in a lower frequency band wherein the capacitive portion of said second path has an inductive component to frequencies in the high frequency band, and a low resistance in circuit with said second path thereby reducing the impedance of said parallel shunt circuits at the resonant frequency of the inductive component and the capacitive portion thereof.

JOHN W. YEARSLEY.

REFERENCES CITED

The following references are of record in the file of this patent:

UNITED STATES PATENTS

| Number | Name | Date |
|---|---|---|
| 1,717,701 | Dubilier | June 18, 1929 |
| 1,829,254 | Asch | Oct. 27, 1931 |
| 1,852,125 | Miessner | Apr. 5, 1932 |
| 1,969,902 | Roberts | Aug. 14, 1934 |
| 1,998,325 | Lyman | Apr. 16, 1935 |
| 2,015,534 | Rose | Sept. 14, 1935 |
| 2,261,203 | Albright | Nov. 4, 1941 |

FOREIGN PATENTS

| Number | Country | Date |
|---|---|---|
| 340,389 | Great Britain | Sept. 2, 1930 |
| 478,605 | Great Britain | Sept. 11, 1936 |
| 480,444 | Great Britain | Aug. 6, 1937 |